US011964285B2

(12) United States Patent
Burkett

(10) Patent No.: US 11,964,285 B2
(45) Date of Patent: Apr. 23, 2024

(54) PULVERIZING DRY-WASHER

(71) Applicant: Joe Evertt Burkett, Coleman, TX (US)

(72) Inventor: Joe Evertt Burkett, Coleman, TX (US)

( * ) Notice: Subject to any disclaimer, the term of this patent is extended or adjusted under 35 U.S.C. 154(b) by 370 days.

(21) Appl. No.: 17/561,395

(22) Filed: Dec. 23, 2021

(65) Prior Publication Data

US 2022/0193693 A1 Jun. 23, 2022

Related U.S. Application Data

(60) Provisional application No. 63/130,280, filed on Dec. 23, 2020.

(51) Int. Cl.
*B02C 19/16* (2006.01)
*B03B 5/06* (2006.01)
*B03B 7/00* (2006.01)

(52) U.S. Cl.
CPC ................ *B03B 7/00* (2013.01); *B02C 19/16* (2013.01); *B03B 5/06* (2013.01)

(58) Field of Classification Search
CPC ......... B02C 19/16; B02C 23/02; B02C 23/14; B03B 4/02; B03B 5/06
See application file for complete search history.

(56) References Cited

U.S. PATENT DOCUMENTS 614,322 A * 11/1898 Hallett ...................... B03B 5/06 209/441
812,474 A * 2/1906 Bagley ...................... B03B 5/06 209/441
3,682,397 A * 8/1972 Bodine ................... B02C 19/16 241/1
9,199,246 B1 * 12/2015 Kikutani ................... B03B 5/06
9,238,229 B1 * 1/2016 Kempf .................... B02C 25/00
2016/0243557 A1 * 8/2016 Rieck ........................ B03B 4/00

FOREIGN PATENT DOCUMENTS

CN 108855331 A * 11/2018 ............... B02C 1/14
CN 112024013 A * 12/2020 ............. B02C 23/14
CN 112156827 A * 1/2021 ............... B02C 1/00
CN 112871272 A * 6/2021 ............. B02C 23/14
CN 114177986 A * 3/2022 ............. B02C 23/14
CN 219616039 U * 9/2023 ............ Y02W 30/91
KR 101565915 B1 * 11/2015 ............ B02C 19/16

* cited by examiner

*Primary Examiner* — Faye Francis

(57) ABSTRACT

A pulverizing dry-washer includes a frame, an upper feeder, a bi-directional pulverizing box, a recovery unit, and a counterweight fan assembly. The upper feeder is angularly attached to an upper end of the frame so that the ore can be screened and discharged into the bi-directional pulverizing box that is positioned below the upper feeder. The bi-directional pulverizing box is mounted onto the recovery unit to further to screen the ore that receives from the upper feeder. A riffle board within the recovery unit is then able to trap precious metal while clay/sedimentary material are discharged through the end of the recovery unit. The counterweight fan assembly is mounted within the recovery unit. An air flow is introduced into the recovery unit via the counterweight fan assembly so that the recovery unit and the bi-directional pulverizing box can be vibrated to separate the precious metal from clay/sedimentary material.

12 Claims, 13 Drawing Sheets

PULVERIZING DRY-WASHER

The current application claims a priority to the U.S. Provisional Patent application Ser. No. 63/130,280 filed on Dec. 23, 2020.

FIELD OF THE INVENTION

The present invention relates generally to dry-washer systems that are utilized to catch heavy materials. More specifically, the present invention is a dry-washer unit with a built-in pulverizing system to catch heavy material, such as gold, diamonds, or other precious metals.

BACKGROUND OF THE INVENTION

Dry washers come in various designs but basically all work off the principal of air, vibration, and gravity and some with static electricity to capture precious metals. The current dry washers have a hopper where the ore is shoveled or placed by other means. The ore goes through an adjustable door to regulate the flow of the ore to the recovery box and flows across riffles designed to catch heavy metals or diamonds or other precious material. What is not captured within the riffles goes to the end of recovery box and falls to ground. Even though, this process has been utilized by many different existing dry washers, lots of precious metals has been lost due to lack of separation of precious metals from the clay and other sedimentary material.

It is therefore an objective of the present invention to improve the recovery of precious metals with a built-in pulverizing system to a dry washer. The present invention does not require an additional power source and operates an air source that is currently being used within the existing dry washers. The same air source is utilized to operate the built-in pulverizing system that greatly increases the ability of catching more precious metal that otherwise would be lost, with no additional processing. The present invention also provides a system that can easily be assemble for operation or disassemble for storage/transportation.

DETAIL DESCRIPTIONS OF THE INVENTION

All illustrations of the drawings are for the purpose of describing selected versions of the present invention and are not intended to limit the scope of the present invention.

Figure 1:
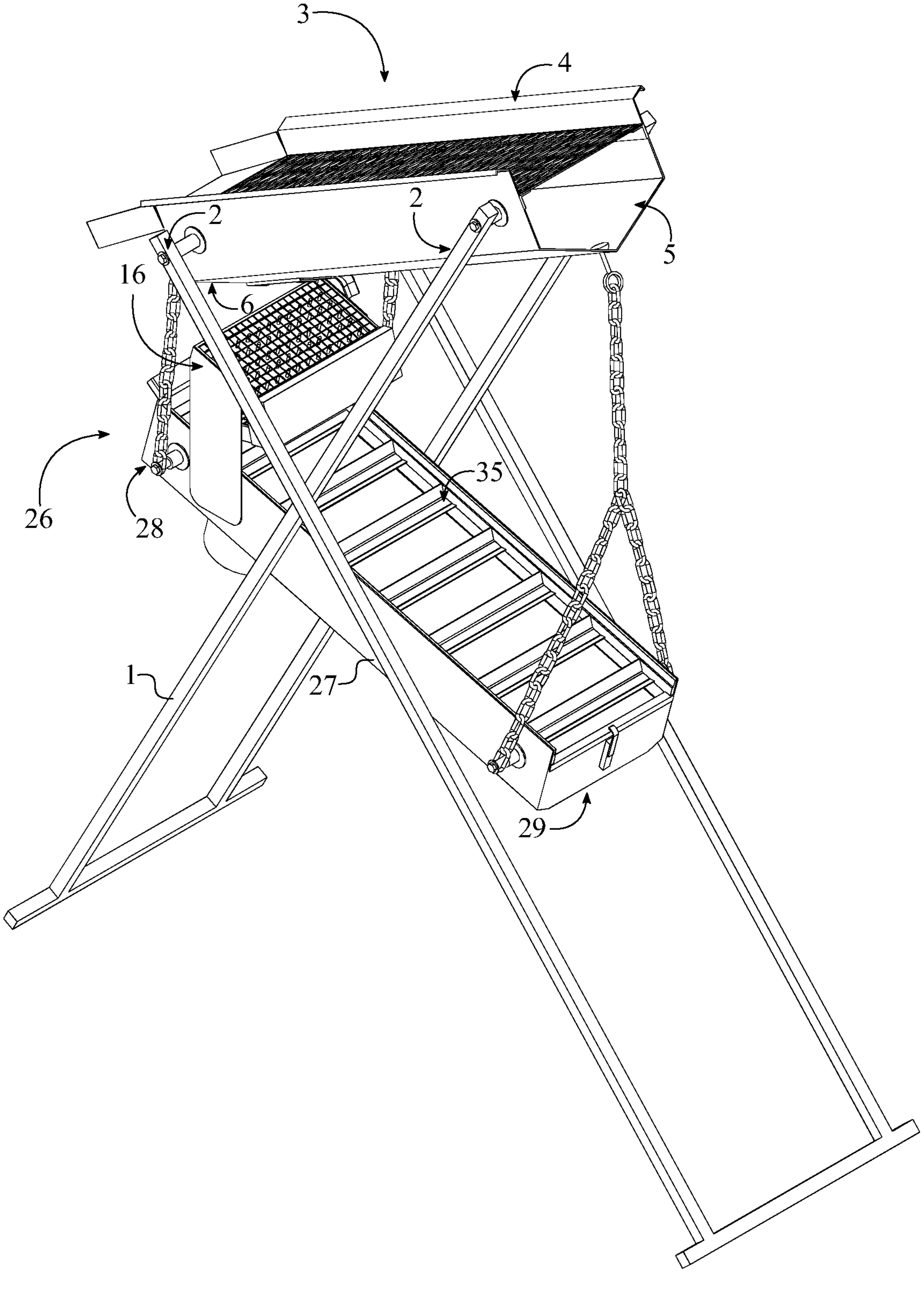
FIG. 1 is a front perspective view of the present invention.
Figure 2:
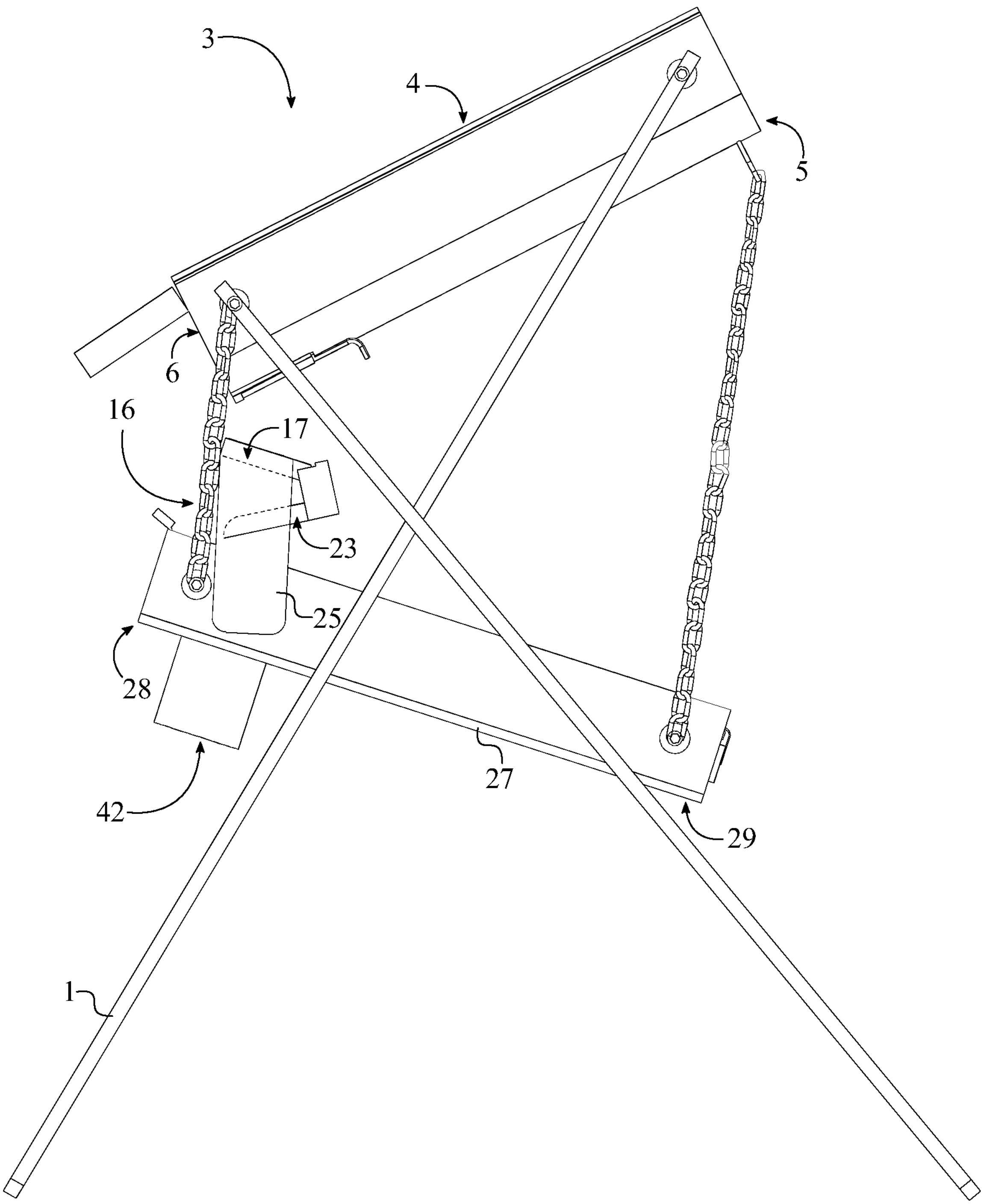
FIG. 2 is a right side view of the present invention.
Figure 3:
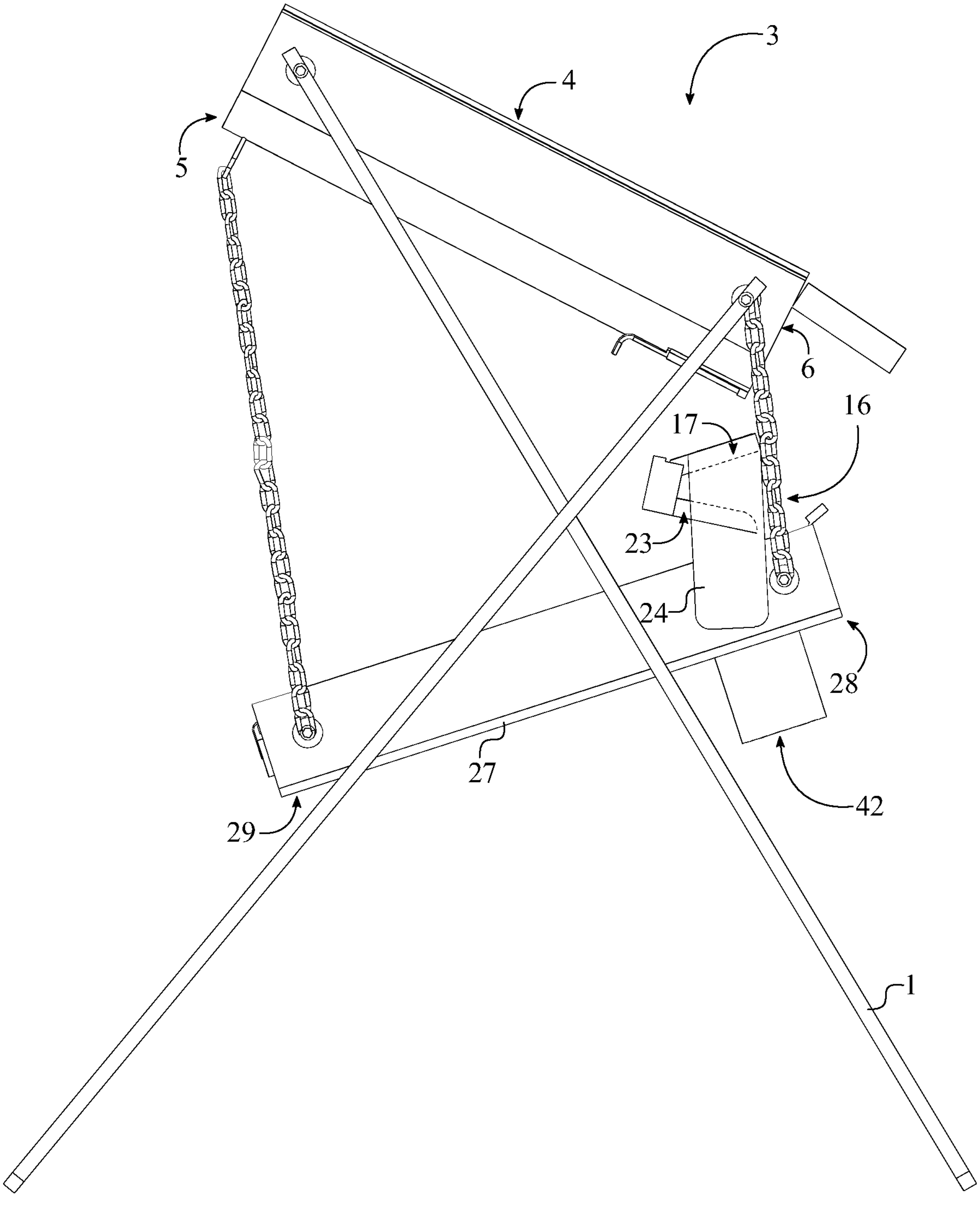
FIG. 3 is a left side view of the present invention.
Figure 4:
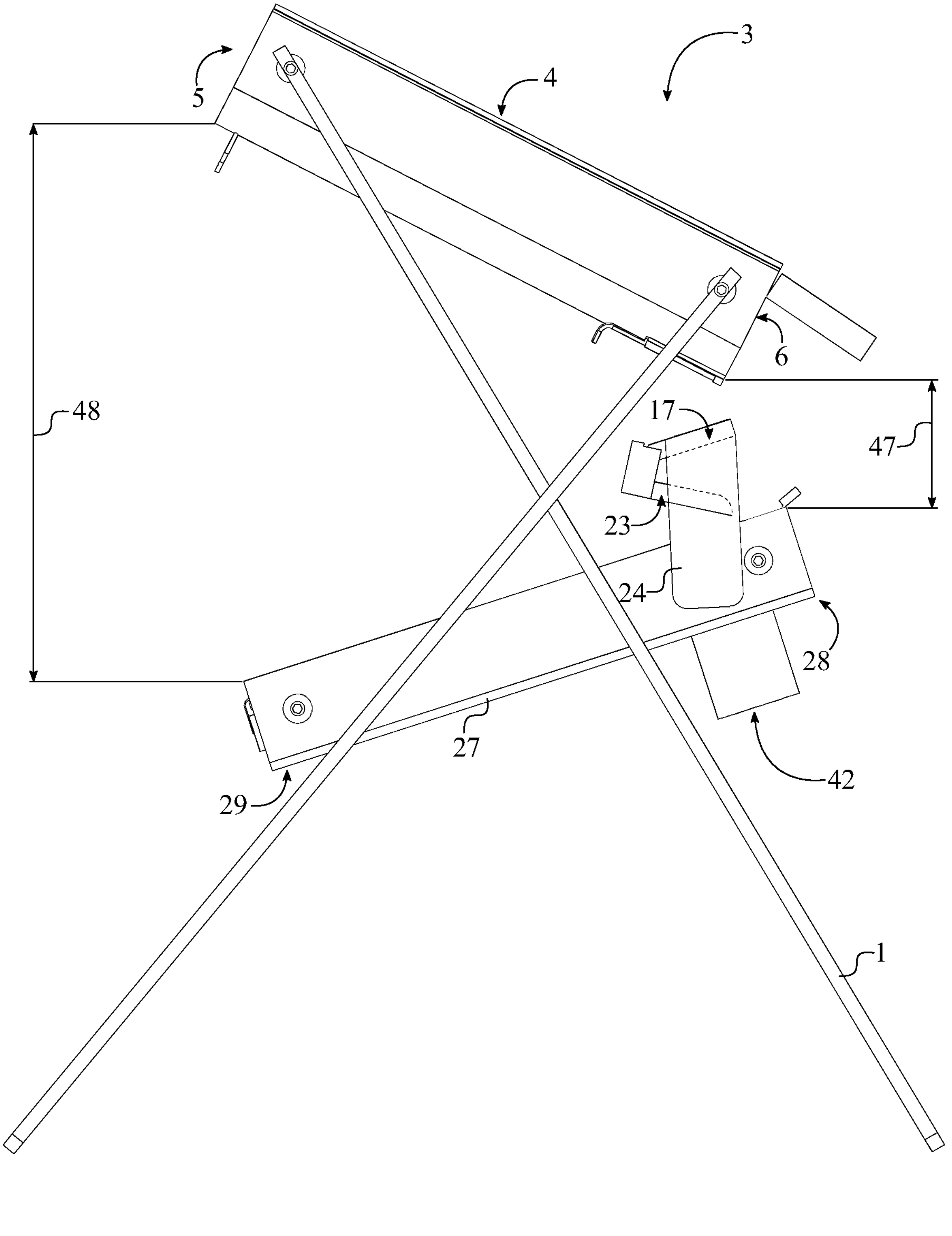
FIG. 4 is a left side view of the present invention, showing the first height and second height difference.

The present invention is a pulverizing dry-washer unit to catch heavy material, such as gold, diamonds, or other precious metals. The present invention utilizes a built-in pulverizing system that uses an air flow to create power and vibration thus pulverizing the ore to liberate the ore from the precious metals. The present invention is powered through an air blower, similar to existing dry-washers, so that the air flow can be provided and vibration can be generated to separate dust and debris from precious metals. As shown in FIG. 1-2, the present invention comprises a frame 1, an upper feeder 3, a bi-directional pulverizing box 16, a recovery unit 26, and a counterweight fan assembly 42. As shown in FIG. 1-3, the bi-directional pulverizing box 16 comprises a first vibrating tray 17, a second vibrating tray 23, a left mount 24, and a right mount 25. As shown in FIG. 1, the recovery unit 26 comprises a vibrating compartment 27 and a riffle board 35.

In reference to the general configuration of the present invention, as shown in FIG. 1-4, a channeled body 4 of the upper feeder 3 is angularly attached to an upper end 2 of the frame 1 so that a first processing stage of ore can be initiated. Then, the ore is discharged into the bi-directional pulverizing box 16 to complete a second processing stage of ore. More specifically, the first vibrating tray 17 is angularly mounted in between the left mount 24 and the right mount 25. The second vibrating tray 23 is angularly mounted in between the left mount 24 and the right mount 25. The left mount 24 and the right mount 25 are laterally mounted to the vibrating compartment 27 of the recovery unit 26 so that the bi-directional pulverizing box 16 can be mounted to the recovery unit 26. As far as the positioning of the recovery unit 26, a proximal end 28 of the vibrating compartment 27 is tethered to a closed end 6 the channeled body 4. A distal end 29 of the vibrating compartment 27 is tethered to an opened end 5 of the channeled body 4. Preferably, the present invention uses a coil chain to complete the tethered connection between the channeled body 4 and the vibrating compartment 27. However, the present invention can use any other type of flexible, strong, and non-elastic straps or ropes to facilitate the tethered connections between the channeled body 4 and the vibrating compartment 27. Resultantly, the first vibrating tray 17 is positioned adjacent to the channeled body 4, and the second vibrating tray 23 is positioned adjacent to a proximal end 28 of the vibrating compartment 27. Once the second processing stage of ore is completed, a third processing stage of ore is taken place within the recovery unit 26. In order to provide proper material flow throughout the present invention, a first height 47 between the proximal end 28 and the closed end 6 is smaller than a second height 48 between the distal end 29 and the opened end 5. In other words, the ore travels from the opened end 5 to the bi-directional pulverizing box 16 due to the downward angle of the upper feeder 3. Then, the ore is screened through the bi-directional pulverizing box 16 and travels from the proximal end 28 to the distal end 29 due to the downward angle of the recovery unit 26. The riffle board 35 is mounted to the vibrating compartment 27 so that precious metals can be trapped while dirt and debris is discharged through the distal end 29. The counterweight fan assembly 42 is integrated into the proximal end 28 of the vibrating compartment 27, wherein the air flow and the vibration are introduced into the present invention via the counterweight fan assembly 42.

In reference to FIG. 1-2, the frame 1 is a collapsible structural member that can elevate the remaining components of the present invention. The frame 1 preferably comprises a first U-shaped body and a second U-shaped body that are interconnected to each other. As a result, the first U-shaped body and the second U-shaped body can be folded flat against each other or opened into a X-shaped profile. A lower end of the frame 1 is configured to rest upon a ground surface or any other type of flat surface. The upper end 2 of the frame 1 comprises four terminal ends that interlock with the upper feeder 3 in order to provide the angular positioning of the upper feeder 3. More specifically, a first terminal end and a second terminal end of the first U-shaped body is positioned offset and lower to a third terminal end and a fourth terminal end of the second U-shaped body. As a result, when the upper feeder 3 is attached to the upper end 2 of the frame 1, the opened end 5 of the channeled body 4 is positioned in between the third terminal end and the fourth terminal end. The closed end 6 of the channeled body 4 is positioned in between the first terminal end and the second terminal end. Furthermore, the frame 1 allows the user to adjust the angular positioning of the upper feeder 3 about the four terminal ends of the upper end 2 with industry standard adjustable mechanisms such as spring loaded button attachments, release pin and opening attachments, and magnetic attachments.

Figure 5:
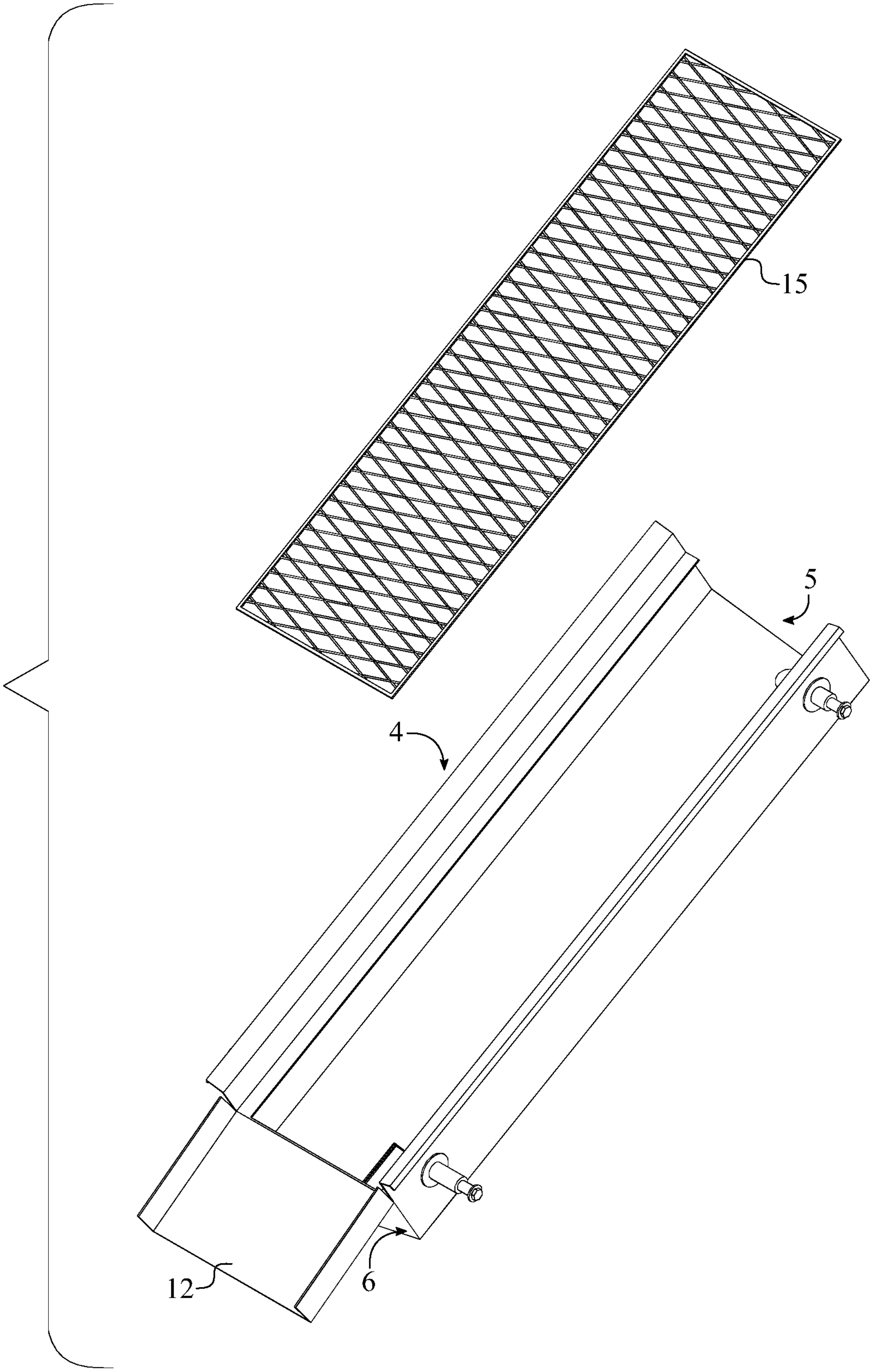
FIG. 5 is an exploded view of the upper feeder of the present invention.
Figure 6:
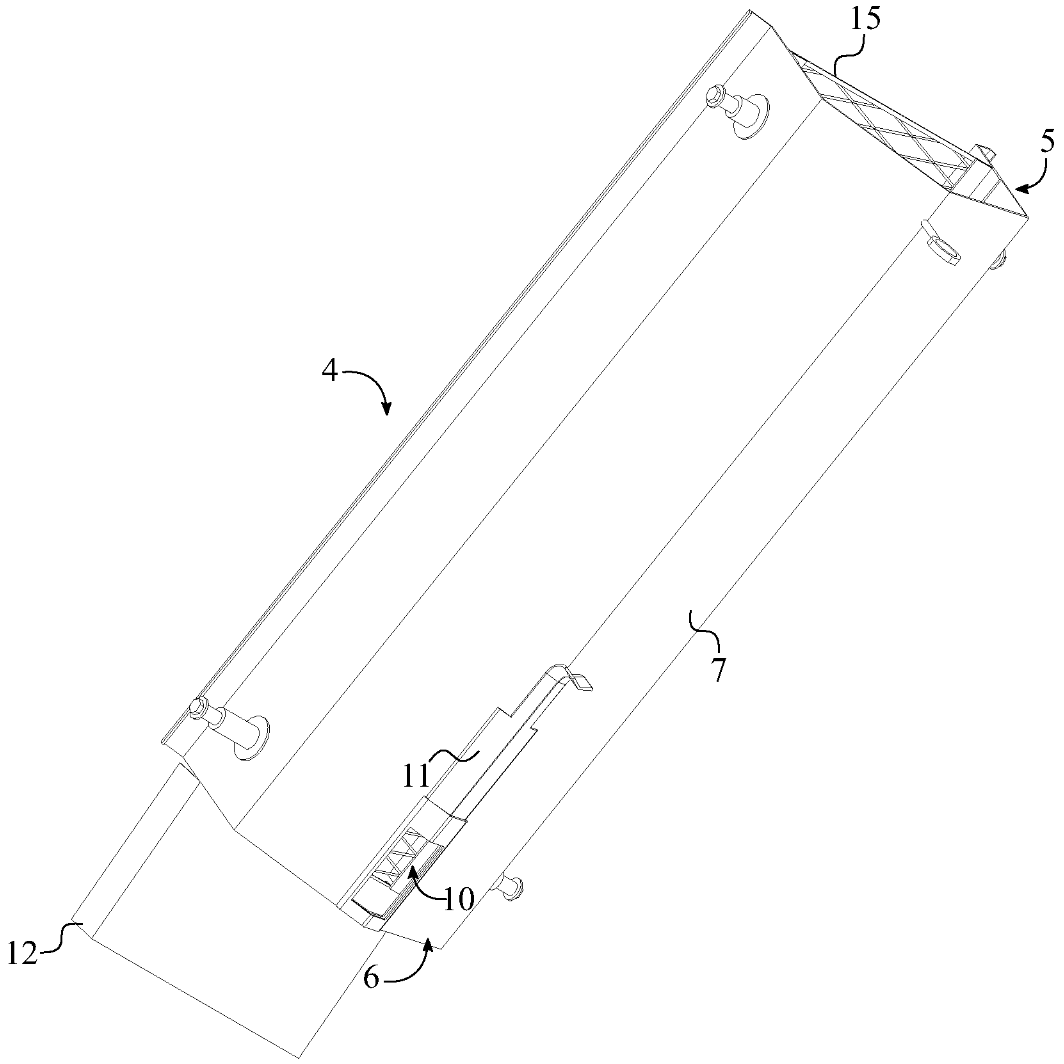
FIG. 6 is a bottom angular view of the upper feeder of the present invention.
Figure 7:
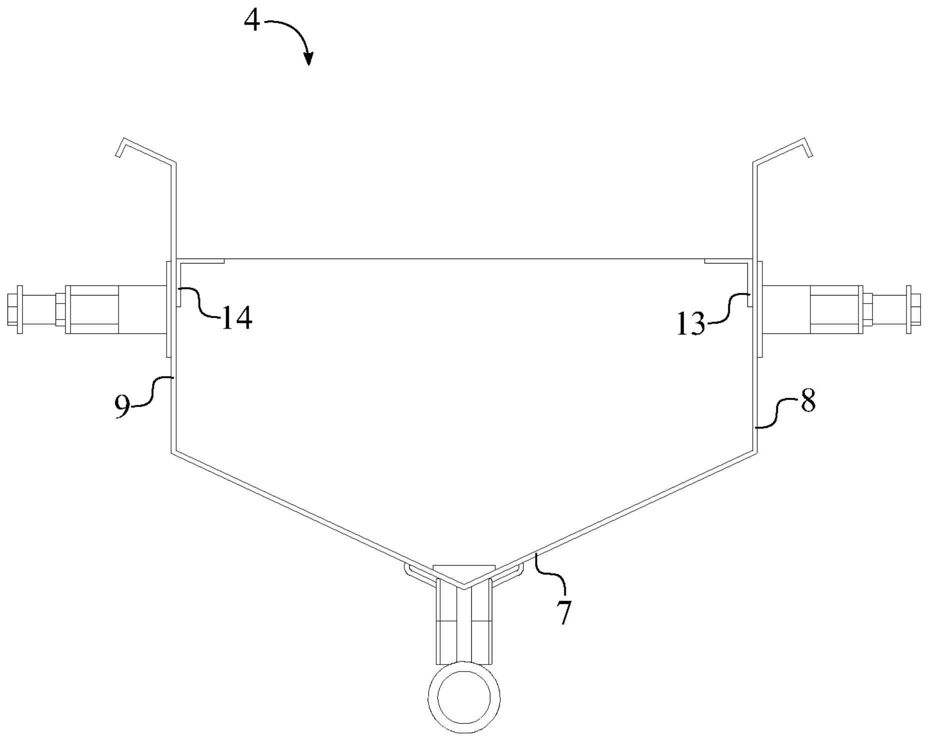
FIG. 7 is a front view of the upper feeder of the present invention.

In reference to FIG. 5-7, the channeled body 4 that functions as the structural base 18 of the upper feeder 3 comprises a channeled bottom 7, a left channeled wall 8, a right channeled wall 9, and an opening 10. More specifically, the left channeled wall 8 and the right channeled wall 9 are oppositely positioned of each other about the channeled bottom 7. The left channeled wall 8 is terminally connected to the channeled bottom 7. The right channeled wall 9 is terminally connected to the channeled bottom 7. Collectively, the channeled bottom 7, the left channeled wall 8, and the right channeled wall 9 delineate a compartment so that the first processing stage of ore can be completed. The opening 10 traverses through the channeled bottom 7 and adjacently positioned to the closed end 6, wherein the opening 10 allows the ore to be discharged into the bi-directional pulverizing box 16 from the upper feeder 3.

In reference to FIG. 5-7, the upper feeder 3 further comprising a left rail 13, a right rail 14, and a perforated plate 15. The left rail 13 is connected along the left channeled wall 8, and the right rail 14 is connected along the right channeled wall 9. The left rail 13 and the right rail 14 function as structural members so that the perforated plate 15 can be removably mounted atop the left rail 13 and the right rail 14. The perforated plate 15 provide a rigid surface so that the ore can be dumped into the upper feeder 3. Due to the vibration of the present invention, the ore is able to screen through the perforated plate 15 thus completing the first processing stage of ore. In other words, the screened-ore that went through the perforated plate 15 falls into the channeled body 4 and travels from the opened end 5 to the closed end 6 so that the screened-ore can be discharged into the bi-directional pulverizing box 16 via the opening 10.

In reference to FIG. 6, the channeled body 4 further comprising a gate 11 that is slidably engaged with the channeled bottom 7 and adjacently positioned below the opening 10. The gate 11 allows the user to open and close the opening 10 so that the discharging flowrate of the screened-ore can be controlled. For example, the user can fully open the gate 11 to maximize the flowrate of the screened-ore through the opening 10 or fully close the gate 11 to stop the flowing of the screened-ore into the bi-directional pulverizing box 16.

In reference to FIG. 5-6, the channeled body 4 further comprising an overhang platform 12 that is adjacently connected to the closed end 6. The overhang platform 12 allows any unscreened material that does not go through the perforated plate 15 to be discharged from the upper feeder 3.

Figure 8:
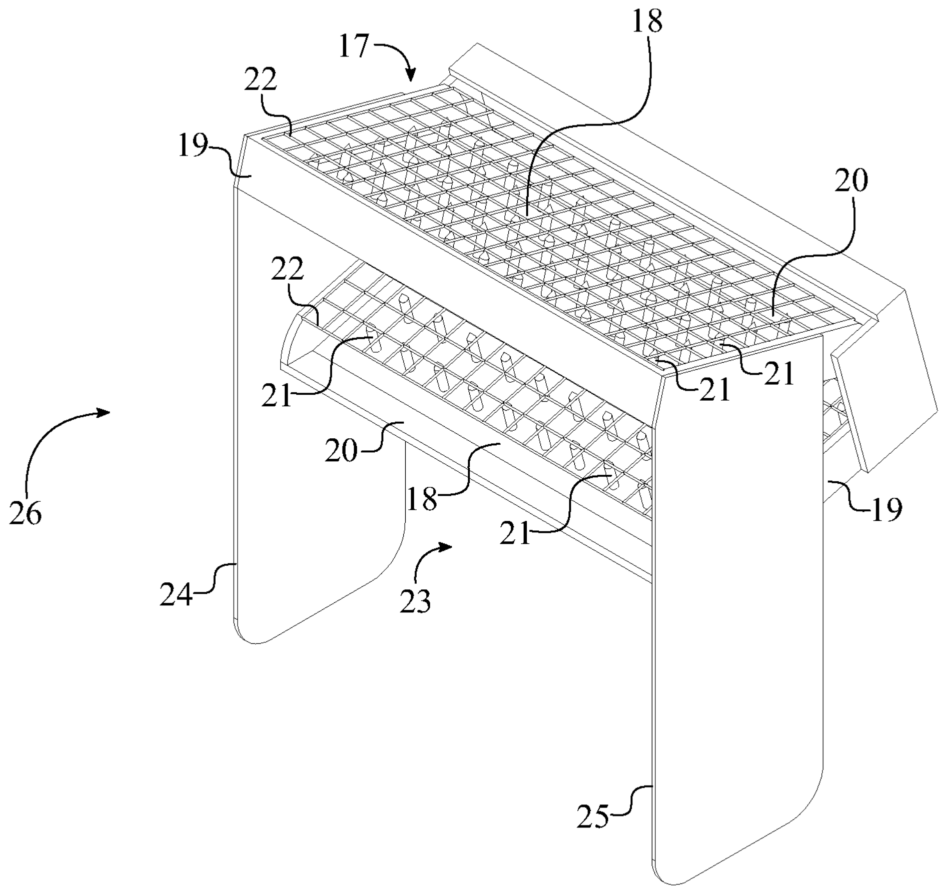
FIG. 8 is a perspective view of the bi-directional pulverizing box of the present invention.

The first vibrating tray 17 and the second vibrating tray 23 complete the second processing stage of ore as the first vibrating tray 17 and the second vibrating tray 23 are angularly connected to the recovery unit 26 via the left mount 24 and the right mount 25. In reference to FIG. 8, the first vibrating tray 17 and the second vibrating tray 23 each comprising a base 18, a wall 19, a discharge port 20, a plurality of sharpened studs 21, and a screening plate 22. More specifically, the wall 19 is perpendicularly connected to the base 18 thus laterally covering three sides of the base 18. The discharge port 20 is delineated in between the base 18 and the wall 19 so that the screened-ore can only be expelled via the discharge port 20. The plurality of sharpened studs 21 is connected to the base 18 and evenly spaced within the base 18 so that the screening plate 22 can be positioned atop the plurality of sharpened studs 21. The plurality of sharpened studs 21 and the screen plate collectively complete the second processing stage of ore as the vibration of present invention.

Figure 9:
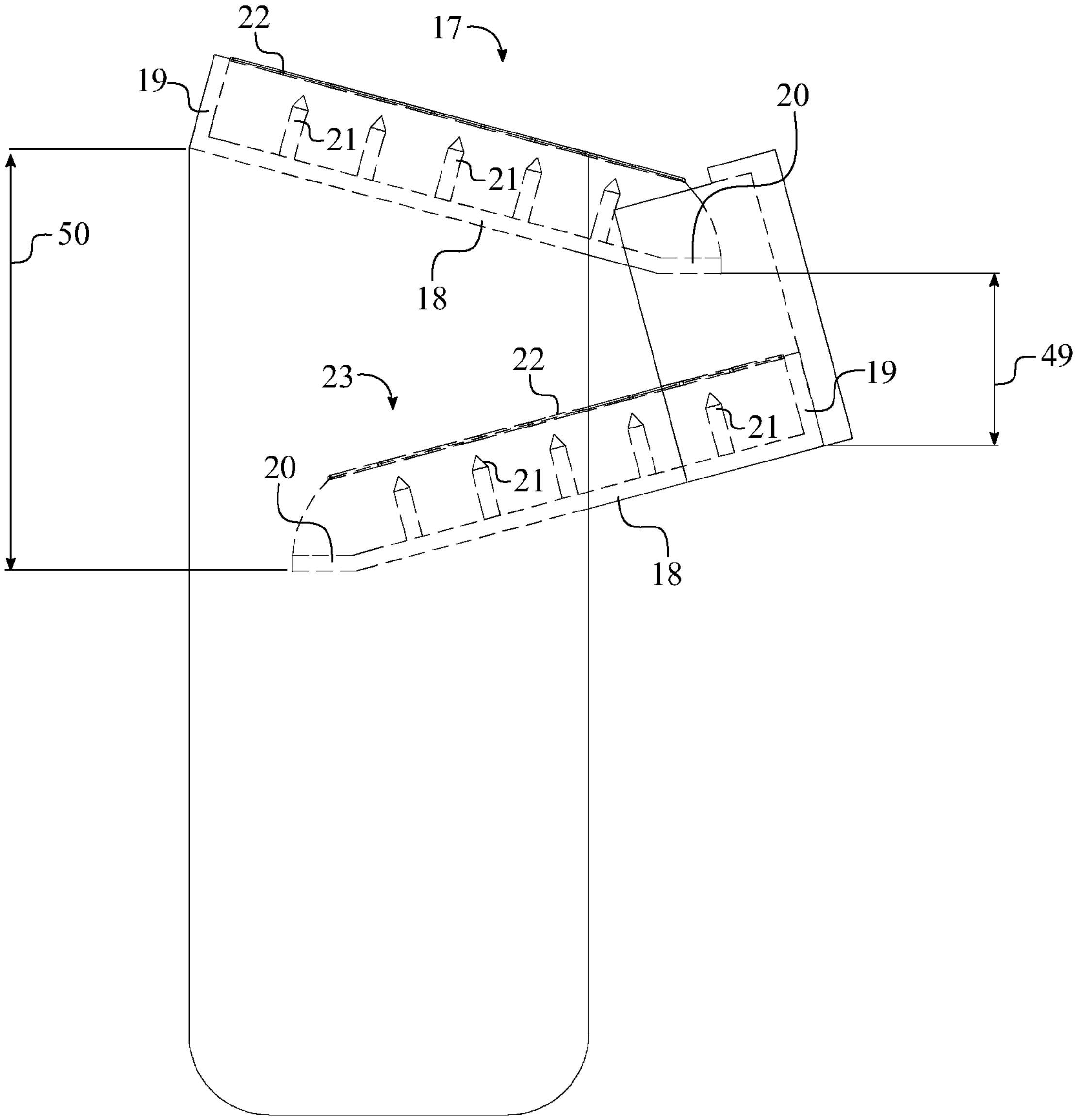
FIG. 9 is a side view of the bi-directional pulverizing box of the present invention, showing the third height and the fourth height.
Figure 10:
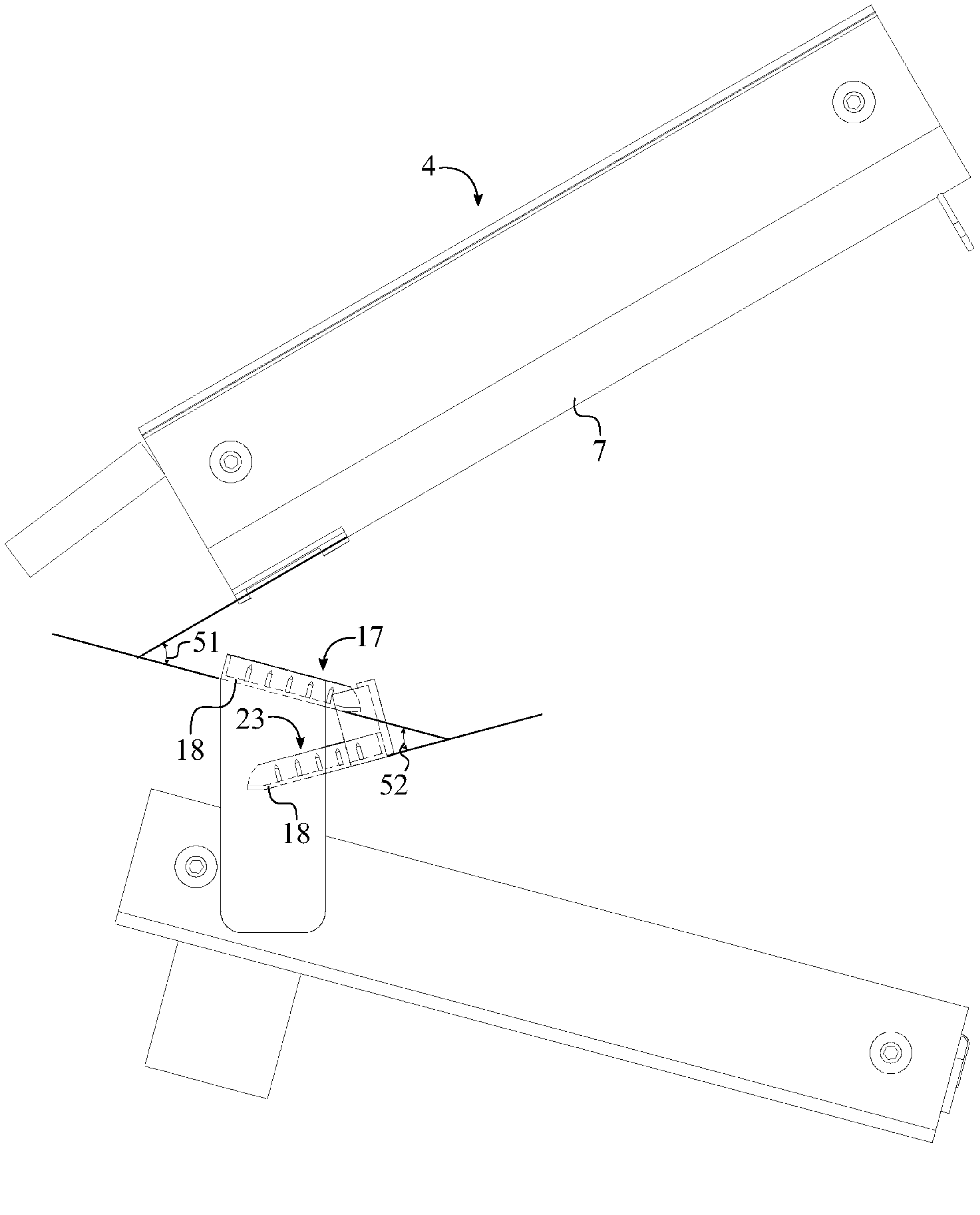
FIG. 10 is a view of the bi-directional pulverizing box and the upper feeder of the present invention, showing the first acute angle and the second acute angle.

The present invention further comprises a third height 49 and a fourth height 50 as shown in FIG. 9-10. More specifically, the third height 49 is configured between the discharge port 20 of the first vibrating tray 17 and the base 18 of the second vibrating tray 23. The fourth height 50 is configured between the discharge port 20 of the second vibrating tray 23 and the base 18 of the first vibrating tray 17. The third height 49 is smaller than the fourth height 50, wherein the height difference delineates the angular positioning of the first vibrating tray 17 and the second vibrating tray 23. In other words, the first vibrating tray 17 angled downward towards the second vibrating tray 23 so that the screened-ore from the opening 10 can travel through the first vibrating tray 17 and discharge into the second vibrating tray 23 via the discharged port of the first vibrating tray 17. Then, the screened-ore from the first vibrating tray 17 travels through the second vibrating tray 23 and discharges into the recovery unit 26 via the discharged port of the second vibrating tray 23. Furthermore, a first acute angle 51 is delineated between the base 18 of the first vibrating tray 17 and the channeled bottom 7 of the channeled body 4. A second acute angle 52 is delineated between the base 18 of the first vibrating tray 17 and the base 18 of the second vibrating tray 23.

Figure 11:
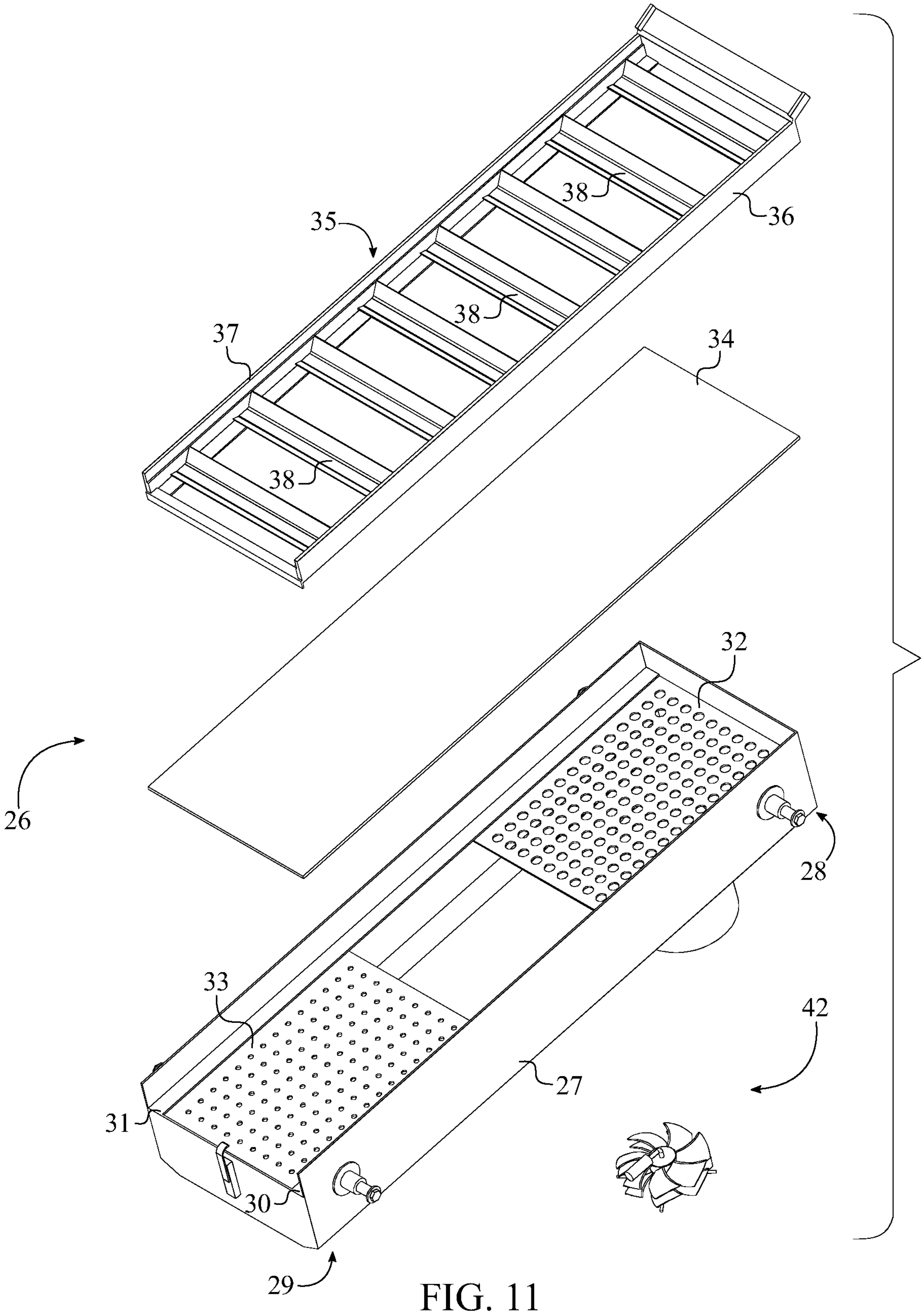
FIG. 11 is an exploded view of the recovery unit of the present invention.

The recovery unit 26 that completes the third processing stage of ore further comprises a left support 30, a right support 31, a proximal baffling panel 32, a distal baffling panel 33, and a decking plate 34 as shown in FIG. 11. the left support 30 and the right support 31 are oppositely positioned of each other within the vibrating compartment 27 so that most of the components of the recovery unit 26 can be positioned within the vibrating compartment 27. More specifically, the left support 30 is internally connected along the vibrating compartment 27 and extended from the proximal end 28 to the distal end 29. The right support 31 is internally connected along the vibrating compartment 27 and extended from the proximal end 28 to the distal end 29. The proximal baffling panel 32 and the distal baffling panel 33 filter out the air flow that enters into the vibrating compartment 27 through the counterweight fan assembly 42. In reference to FIG. 11, the proximal baffling panel 32 is connected to the left support 30 and the right support 31 and adjacently positioned to the proximal end 28. Furthermore, the proximal baffling panel 32 comprises a first set of air-flow holes so that the air flow from the counterweight fan assembly 42 can penetrate and bounce below the decking plate 34 to trap heavier precious metals within the riffle board 35. The distal baffling panel 33 is connected to the left support 30 and the right support 31 and adjacently positioned to the distal end 29. Furthermore, the distal baffling panel 33 comprises a second set of air-flow holes so that the air flow from the counterweight fan assembly 42 can dampen below the decking plate 34 to trap lighter precious metals within the riffle board 35. Furthermore, a diameter for each hole of the first set of air-flow holes is larger than a diameter for each hole of the second set of air-flow holes. The decking plate 34 is positioned along the left support 30 and the right support 31 and atop the proximal baffling panel 32 and the distal baffling panel 33. The riffle board 35 is positioned atop the decking plate 34 and terminally mounted to the vibrating compartment 27. As a result, the decking plate 34 is compressed and secured onto the left support 30 and the right support 31 by the riffle board 35. The decking board is a perforated board that allows the air flow from the proximal baffling panel 32 and the distal baffling panel 33 to diffuse through so that the air flow escape through the riffle board 35. As a result, any precious metals that get trapped by the riffle board 35 are collected on top of the decking plate 34 during the operation of the present invention.

In reference to FIG. 11, the riffle board 35 comprises a left arm 36, a right arm 37, and a plurality of cross-riffles 38. Each of the plurality of cross-riffles 38 is equally spaced in between the left arm 36 and the right arm 37 and terminally connected to the left arm 36 and the right arm 37. When the riffle board 35 is mounted to the vibrating compartment 27, the left arm 36 and the right arm 37 are positioned along the decking plate 34 and the plurality of cross-riffles 38 is positioned across the decking plate 34. Optionally, a screened mesh can also be removably placed on top of the riffle board 35 to reduce the air flow when necessary.

Figure 12:
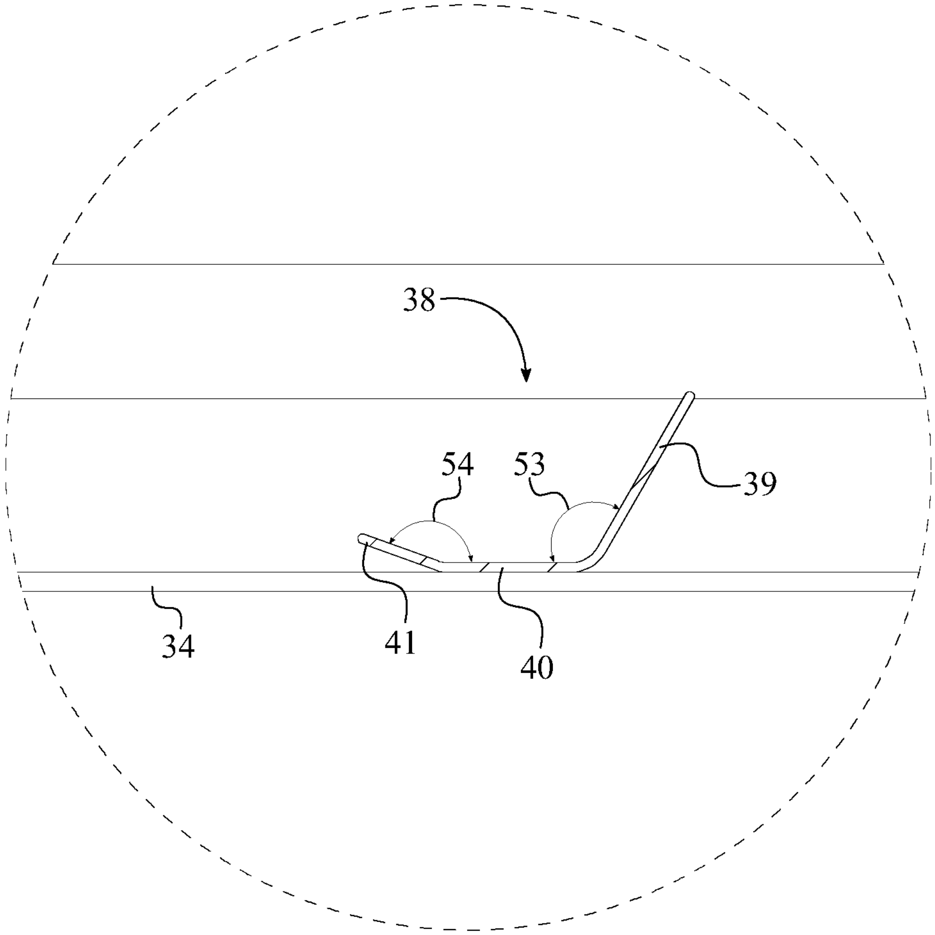
FIG. 12 is a cross-sectional view of each of the plurality of cross-riffles of the present invention, showing the third angle and the fourth angle.

As shown in FIG. 12, each of the plurality of cross-riffles 38 comprises a first riffle section 39, a second riffle section 40, and a third riffle section 41. The first riffle section 39 is angularly connected to the second riffle section 40. The third riffle section 41 is angularly connected to the second riffle section 40. The first riffle section 39 and the third riffle section 41 are oppositely position of each other about the second riffle section 40. Furthermore, a third angle 53 is configured between the first riffle section 39 and the second riffle section 40 wherein the third angle 53 is an obtuse angle. A fourth angle 54 is configured between the third riffle section 41 and the second riffle section 40 wherein the fourth angle 54 is 160 degrees. When the riffle board 35 is mounted to the vibrating compartment 27, the second riffle section 40 is positioned parallel to the decking plate 34. More specifically, the first riffle section 39 delineates an acute angle with the decking plate 34 while the third riffle section 41 delineates 20 degree angle with the decking plate 34.

Figure 13:
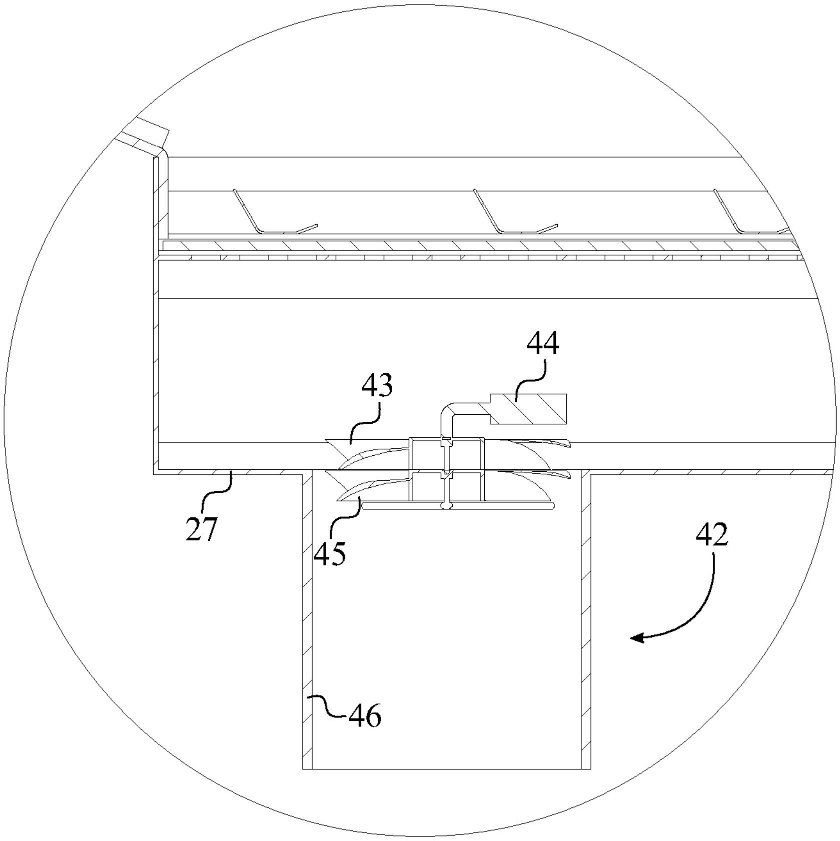
FIG. 13 is a cross-sectional view of the recovery unit the present invention, showing the positioning of the counterweight fan assembly.

The counterweight fan assembly 42 functions as the inlet body that provides the air flow to the present invention. Furthermore, configuration of the counterweight fan assembly 42 is also able to generate vibration from the air flow so that the upper feeder 3, the bi-directional pulverizing box 16, and the recovery unit 26 can be vibrated separate precious metals from the ore. More specifically, the counterweight fan assembly 42 comprises a first fan blade 43, a counterweight arm 44, a second fan blade 45, and an air feeder inlet 46 as shown in FIG. 13. The air feeder inlet 46 is mounted to the vibrating compartment 27 and positioned opposite of the decking plate 34 so that the air blower can be mounted to provide to the air flow. The air feeder inlet 46 is in fluid communication with the vibrating compartment 27 thus discharging the air flow from the air blower into the vibrating compartment 27. The second fan blade 45 is rotatably mounted to the air feeder inlet 46 and positioned within the air feeder inlet 46. The first fan blade 43 is rotatably mounted to the air feeder inlet 46 and positioned within the vibrating compartment 27. In other words, the second fan blade 45 is internally positioned and rotate within the air feeder. The first fan blade 43 is internally positioned within the vibrating compartment 27 and externally positioned from the air feeder, wherein the first fan blade 43 rotate above the air feeder. The counterweight arm 44 is concentrically mounted to the first fan blade 43 so that the rotational force of the first fan blade 43 and the weight of the counterweight arm 44 are able to generate vibration within the present invention. Furthermore, the vibration generated by the counterweight arm 44 is able to apply to the recovery unit 26, the bi-directional pulverizing box 16, and the upper feeder 3 due to the tethered connections of the present invention.

Although the invention has been explained in relation to its preferred embodiment, it is to be understood that many other possible modifications and variations can be made without departing from the spirit and scope of the invention as hereinafter claimed.

What is claimed is:

1. A pulverizing dry-washer comprising:

a frame;

an upper feeder;

a bi-directional pulverizing box;

a recovery unit;

a counterweight fan assembly;

the bi-directional pulverizing box comprising a first vibrating tray, a second vibrating tray, a left mount, and a right mount;

the recovery unit comprising a vibrating compartment and a riffle board;

a channeled body of the upper feeder being angularly attached to an upper end of the frame;

the first vibrating tray being angularly mounted in between the left mount and the right mount;

the second vibrating tray being angularly mounted in between the left mount and the right mount;

the left mount and the right mount being laterally mounted to the vibrating compartment of the recovery unit;

the first vibrating tray being positioned adjacent to the channeled body;

the second vibrating tray being positioned adjacent to a proximal end of the vibrating compartment;

the proximal end of the vibrating compartment being tethered to a closed end the channel body;

a distal end of the vibrating compartment being tethered to an opened end of the channel body;

a first height between the proximal end and the closed end being smaller than a second height between the distal end and the opened end;

the riffle board being mounted to the vibrating compartment; and the counterweight fan assembly being integrated into the proximal end of the vibrating compartment.

2. The pulverizing dry-washer as claimed in claim 1 comprising:

the channeled body comprising a channeled bottom, a left channeled wall, a right channeled wall, and an opening;

the left channeled wall and the right channeled wall being oppositely positioned of each other about the channeled bottom;

the left channeled wall being terminally connected to the channeled bottom;

the right channeled wall being terminally connected to the channeled bottom;

the opening traversing through the channeled bottom; and the opening being adjacently positioned to the closed end.

3. The pulverizing dry-washer as claimed in claim 2 comprising:

the channeled body further comprising a gate;

the gate being slidably engaged with the channeled bottom; and the gate being adjacently positioned below the opening.

4. The pulverizing dry-washer as claimed in claim 2 comprising:

the channeled body further comprising an overhang platform; and the overhang platform being adjacently connected to the closed end.

5. The pulverizing dry-washer as claimed in claim 1 comprising:

the upper feeder further comprising a left rail, a right rail, and a perforated plate;

the channeled body comprising a left channeled wall and a right channeled wall;

the left rail being connected along the left channeled wall;

the right rail being connected along the right channeled wall; and the perforated plate being removably mounted atop the left rail and the right rail.

6. The pulverizing dry-washer as claimed in claim 1 comprising:

the first vibrating tray and the second vibrating tray each comprising a base, a wall, a discharge port, a plurality of sharpened studs, and a screening plate;

the wall being perpendicularly connected to the base;

the discharge port being delineated in between the base and the wall;

the plurality of sharpened studs being connected to the base; and the screening plate being positioned atop the plurality of sharpened studs.

7. The pulverizing dry-washer as claimed in claim 6 comprising:

a third height;

a fourth height;

the third height being configured between the discharge port of the first vibrating tray and the base of the second vibrating tray;

the fourth height being configured between the discharge port of the second vibrating tray and the base of the first vibrating tray; and the third height being smaller than the fourth height.

8. The pulverizing dry-washer as claimed in claim 6 comprising:

a first acute angle being delineated between the base of the first vibrating tray and a channeled bottom of the channeled body; and a second acute angle being delineated between the base of the first vibrating tray and the base of the second vibrating tray.

9. The pulverizing dry-washer as claimed in claim 1 comprising:

the recovery unit further comprising a left support, a right support, a proximal baffling panel, a distal baffling panel, and a decking plate;

the left support and the right support being oppositely positioned of each other within the vibration compartment;

the left support being internally connected along the vibrating compartment;

the left support being extended from the proximal end to the distal end;

the right support being internally connected along the vibrating compartment;

the right support being extended from the proximal end to the distal end;

the proximal baffling panel being connected to the left support and the right support;

the proximal baffling panel being adjacently positioned to the proximal end;

the distal baffling panel being connected to the left support and the right support;

the distal baffling panel being adjacently positioned to the distal end;

the decking plate being positioned along the left support and the right support;

the riffle board being positioned atop the decking plate;

the riffle board being terminally mounted to the vibrating compartment; and the decking plate being compressed onto the left support and the right support by the riffle board.

10. The pulverizing dry-washer as claimed in claim 1 comprising:

the riffle board comprising a left arm, a right arm, and a plurality of cross-riffles;

each of the plurality of cross-riffles being equally spaced in between the left arm and the right arm; and each of the plurality of cross-riffles being terminally connected to the left arm and the right arm.

11. The pulverizing dry-washer as claimed in claim 10 comprising:

each of the plurality of cross-riffles comprising a first riffle section, a second riffle section, and a third riffle section;

the first riffle section being angularly connected to the second riffle section;

the third riffle section being angularly connected to the second riffle section;

the first riffle section and the third riffle section being oppositely position of each other about the second riffle section;

a third angle between the first riffle section and the second riffle section being an obtuse angle;

a fourth angle between the third riffle section and the second riffle section being 160 degrees; and the second riffle section being positioned parallel to the decking plate.

12. The pulverizing dry-washer as claimed in claim 1 comprising:

the counterweight fan assembly comprising a first fan blade, a counterweight arm, a second fan blade, and an air feeder inlet;

the air feeder inlet being mounted to the vibrating compartment;

the air feeder inlet being in fluid communication with the vibrating compartment;

the second fan blade being rotatably mounted to the air feeder inlet;

the second fan blade being positioned within the air feeder inlet;

the first fan blade being rotatably mounted to the air feeder inlet;

the first fan blade being positioned within the vibrating compartment; and the counterweight arm being concentrically mounted to the first fan blade.

* * * * *